US010157609B2

(12) United States Patent
Plumpe et al.

(10) Patent No.: US 10,157,609 B2
(45) Date of Patent: *Dec. 18, 2018

(54) LOCAL AND REMOTE AGGREGATION OF FEEDBACK DATA FOR SPEECH RECOGNITION

(71) Applicant: Microsoft Technology Licensing, LLC, Redmond, WA (US)

(72) Inventors: Michael D. Plumpe, Seattle, WA (US); Julian Odell, Seattle, WA (US); Jon Hamaker, Issaquah, WA (US); Rob Chambers, Sammamaish, WA (US); Christopher Le, Redmond, WA (US); Onur Domanic, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 127 days.

This patent is subject to a terminal disclaimer.

(21) Appl. No.: 14/799,533

(22) Filed: Jul. 14, 2015

(65) Prior Publication Data

US 2016/0012817 A1 Jan. 14, 2016

Related U.S. Application Data

(63) Continuation of application No. 12/481,439, filed on Jun. 9, 2009, now Pat. No. 9,111,540.

(51) Int. Cl.
*G10L 15/00* (2013.01)
*G10L 15/065* (2013.01)
(Continued)

(52) U.S. Cl.
CPC .............. *G10L 15/01* (2013.01); *G10L 15/02* (2013.01); *G10L 15/063* (2013.01);
(Continued)

(58) Field of Classification Search
CPC ......... G10L 15/00; G10L 15/08; G10L 15/22; G10L 15/26; G10L 15/265; G10L 15/063; G10L 15/065; G10L 15/07; G10L 15/075; G10L 17/00; G10L 17/005; G10L 17/22; G10L 17/04; G10L 2015/063; G10L 2015/0631; G10L 2015/0635; G10L 2015/22; G10L 2015/221; G10L 2015/223; G10L 2015/225; G10L 2015/228; G10L 2015/227
(Continued)

(56) References Cited

U.S. PATENT DOCUMENTS 6,418,410 B1 * 7/2002 Nassiff et al. ................ 704/251
6,691,089 B1 2/2004 Su et al.
(Continued)

OTHER PUBLICATIONS

"Final Office Action Issued in U.S. Appl. No. 12/481,439", dated Sep. 24, 2012, 23 Pages.
(Continued)

*Primary Examiner* — Paras D Shah

(57) ABSTRACT

A local feedback mechanism for customizing training models based on user data and directed user feedback is provided in speech recognition applications. The feedback data is filtered at different levels to address privacy concerns for local storage and for submittal to a system developer for enhancement of generic training models.

17 Claims, 6 Drawing Sheets

(51) Int. Cl.
*G10L 15/01* (2013.01)
*G10L 15/30* (2013.01)
*G10L 15/02* (2006.01)
*G10L 15/06* (2013.01)
*G10L 15/14* (2006.01)
*G10L 15/187* (2013.01)

(52) U.S. Cl.
CPC ............ *G10L 15/065* (2013.01); *G10L 15/14* (2013.01); *G10L 15/187* (2013.01); *G10L 15/30* (2013.01); *G10L 2015/025* (2013.01); *G10L 2015/0631* (2013.01); *G10L 2015/0635* (2013.01)

(58) Field of Classification Search
USPC .................... 704/231, 236, 251, 252, 257
See application file for complete search history.

(56) References Cited

U.S. PATENT DOCUMENTS

| | | | |
|---|---|---|---|
| 7,266,495 B1 | 9/2007 | Beaufays et al. | |
| 7,315,818 B2 * | 1/2008 | Stevens et al. | 704/235 |
| 7,383,183 B1 * | 6/2008 | Davis et al. | 704/235 |
| 7,437,924 B2 * | 10/2008 | Chen | 73/170.05 |
| 7,873,523 B2 * | 1/2011 | Potter et al. | 704/275 |
| 7,937,270 B2 * | 5/2011 | Smaragdis et al. | 704/256 |
| 8,473,451 B1 | 6/2013 | Hakkani-Tur et al. | |
| 2001/0046658 A1 | 11/2001 | Wasowicz | |
| 2002/0116194 A1 * | 8/2002 | Lewis et al. | 704/257 |
| 2002/0138274 A1 * | 9/2002 | Sharma et al. | 704/270 |
| 2006/0155539 A1 * | 7/2006 | Chen et al. | 704/251 |
| 2007/0016419 A1 * | 1/2007 | Lee et al. | 704/250 |
| 2007/0081428 A1 * | 4/2007 | Malhotra et al. | 369/25.01 |
| 2007/0192101 A1 | 8/2007 | Braho et al. | |
| 2007/0233497 A1 | 10/2007 | Paek et al. | |
| 2008/0037719 A1 * | 2/2008 | Doren | 379/85 |
| 2008/0208579 A1 * | 8/2008 | Weiss et al. | 704/244 |
| 2008/0228496 A1 | 9/2008 | Yu et al. | |
| 2009/0018833 A1 | 1/2009 | Kozat et al. | |
| 2010/0082342 A1 * | 4/2010 | Erhart et al. | 704/246 |

OTHER PUBLICATIONS

"Non Final Office Action Issued in U.S. Appl. No. 12/481,439", dated May 23, 2012, 22 Pages.

"Non Final Office Action Issued in U.S. Appl. No. 12/481,439", dated Dec. 17, 2014, 25 pages.

"Notice of Allowance Issued in U.S. Appl. No. 12/481,439", dated Apr. 14, 2015, 15 Pages.

Flournoy, et al., "Secondary Benefits of Feedback and User Interaction in Machine Translation Tools", Published on: Jan. 2001, Available at: http://www.cs.jhu.edu/~ccb/publications/secondary-benefits-of-user-feedback-in-mt.pdf.

Jeff, Whatcott, "The Google iPhone Voice App Angle that No One is Talking About", Published on: Nov. 18, 2008, Available at: http://web.archive.org/web/20081230080231/http://jeffwhatcott.com/content/google-iphone-voice-app-angle-no-one-talking-about.

Redmond, Wash, "Listening to Users is the Key to Speech Recognition at Microsoft", Published on: Feb. 1, 2007, Available at: http://web.archive.org/web/20070218123726/http://www.microsoft.com/enable/microsoft/chambers.aspx.

* cited by examiner

LOCAL AND REMOTE AGGREGATION OF FEEDBACK DATA FOR SPEECH RECOGNITION

CROSS-REFERENCE TO RELATED APPLICATIONS

This Application is a continuation under 35 U.S.C. § 120 of U.S. patent application Ser. No. 12/481,439 filed on Jun. 9, 2009, now U.S. Pat. No. 9,111,540 issued on Aug. 18, 2015, by the same inventors, commonly assigned herewith, The disclosure of the U.S. Patent is hereby incorporated by reference in its entirety.

BACKGROUND

One of the forefronts of computing technology is speech recognition, because people often find speech to be familiar and convenient way to communicate information. With computerized applications controlling many aspects of daily activities from word processing to controlling appliances, providing speech recognition based interfaces for such applications is a high priority of research and development for many companies. Web site operators and other content providers are deploying voice driven interfaces for allowing users to browse their content. One of the more visible implementations of speech recognition is Interactive Voice Response (IVR) systems, where caller can interact with a computer application through natural speech as opposed to pressing telephone keys or other mechanic methods.

In a traditional speech recognition system, the audio from a phone call may be recorded, transcribed, and then used to directly train a new speech recognition system as part of a feedback loop for a datacenter. System developers may also purchase sampled recordings from data consolidators in order to generate/enhance their training models. In a local application environment, where the speech recognition system is installed, operated, and maintained by a party (e.g. a user) independent from the system developer, there is little incentive and significant privacy concerns for the user to provide the exact audio of what they said to the system developer. This may disadvantage the system developer's efforts to enhance and update the speech recognition product with accurate data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a local feedback mechanism for customizing training models based on user data and directed user feedback in speech recognition applications, where feedback data may be filtered to address privacy concerns and further provided to a system developer for enhancement of generic training models. According to some embodiments, locally employed data may also be filtered to address privacy concerns at a different level than the data to be submitted to the system developer. Moreover, collection of data once considered potentially private but later identified as not private may be enabled.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a single framework for local and remote feedback loops for enhancing training models in speech recognition systems may incentivize users to submit valuable data to system developers enabling them to improve accuracy of the systems. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also the term "engine" (as in speech recognition engine) is used to refer to a self contained software application that has input(s) and an output(s).

Figure 1:
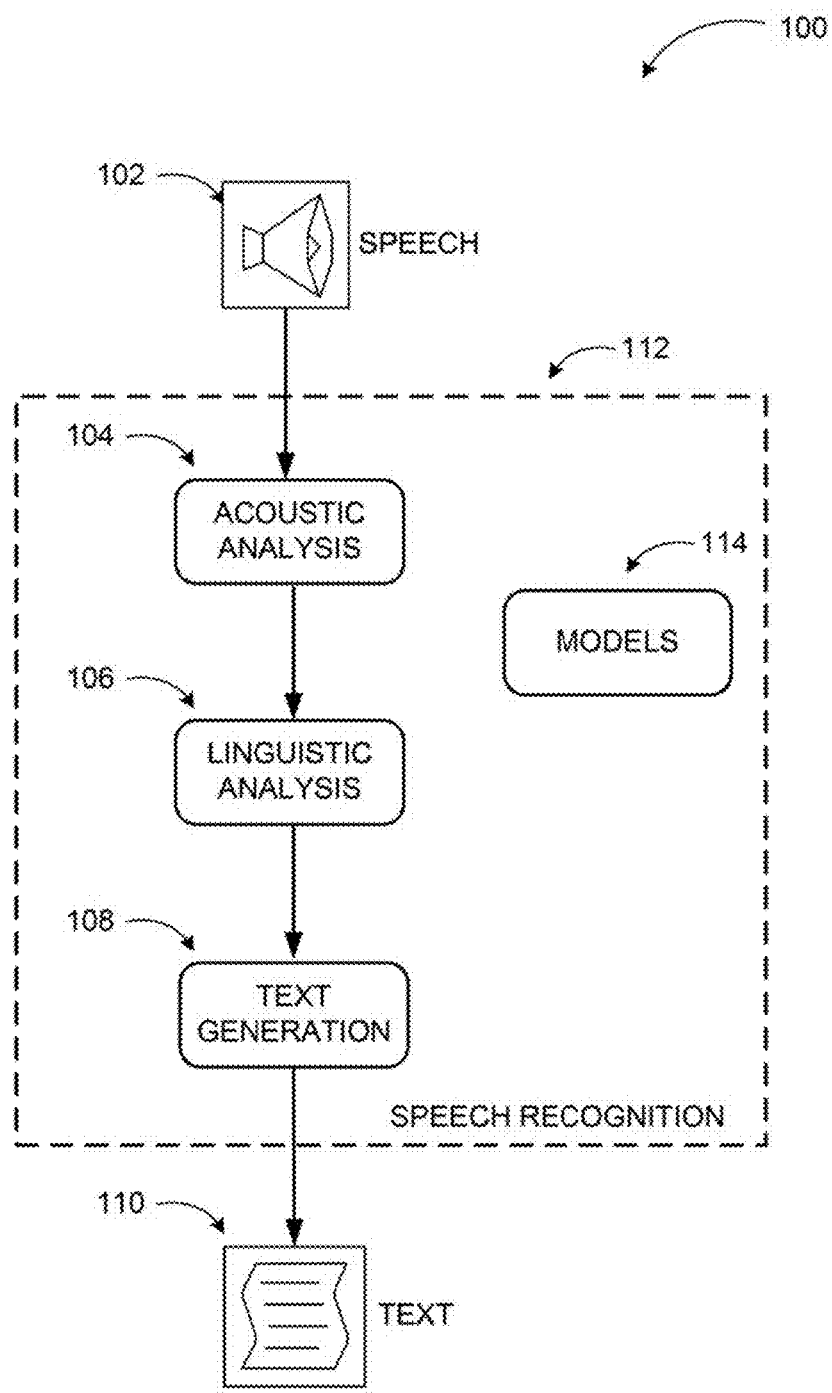
FIG. 1 is a conceptual high level diagram of a speech recognition system.

FIG. 1 is a block diagram illustrating top level components in a speech recognition system. Speech recognition system 112 begins the process of speech recognition by receiving speech input 102. The audio signal is provided to acoustic analysis module 104 and linguistic analysis 106, followed by generation of textual data 110 by text generation module 108. Speech recognition system 112 recognizes words, phrases, and the like, based on customized language and acoustic models (114). The consumption of the recognized audio and the recognition processes may be an interactive one, according to some embodiments, where user feedback for selection or correction of a recognized portion of the received speech is received before the entire utterance is recognized.

As mentioned before, speech recognition process takes in audio input and provides textual or other output. For example, the output may include commands or other control input for different applications without the intermediate step of constructing textual data. In recognizing utterances, a speech recognition system may utilize a language model and an acoustic model. The language model may be generated and/or adapted through statistical modeling of words, phrases, fragments, etc. that form a user's profile. Statistical data from user language model statistics and a generic language model may be used in generating the adapted language model customized for the particular user's profile.

The acoustic model may be based on live or stored audio recordings by the users, which are used for generating statistics data to adapt a generic acoustic model to the customized acoustic model. The acoustic and language models are then used by the speech recognition process to generate textual data for processing by other applications.

Components of the speech recognizing system may be loaded into a server, executed over a distributed network, executed in a client device, and the like. Furthermore, the components described above are for illustration purposes only, and do not constitute a limitation on the embodiments. A speech recognizing system may be implemented using fewer or additional components in various orders such as additional models (e.g. confidence models). Individual components may be separate applications, or part of a single application. The speech recognition system or its components may include individually or collectively a user interface such as a web service, a Graphical User Interface (GUI), and the like.

Figure 2:
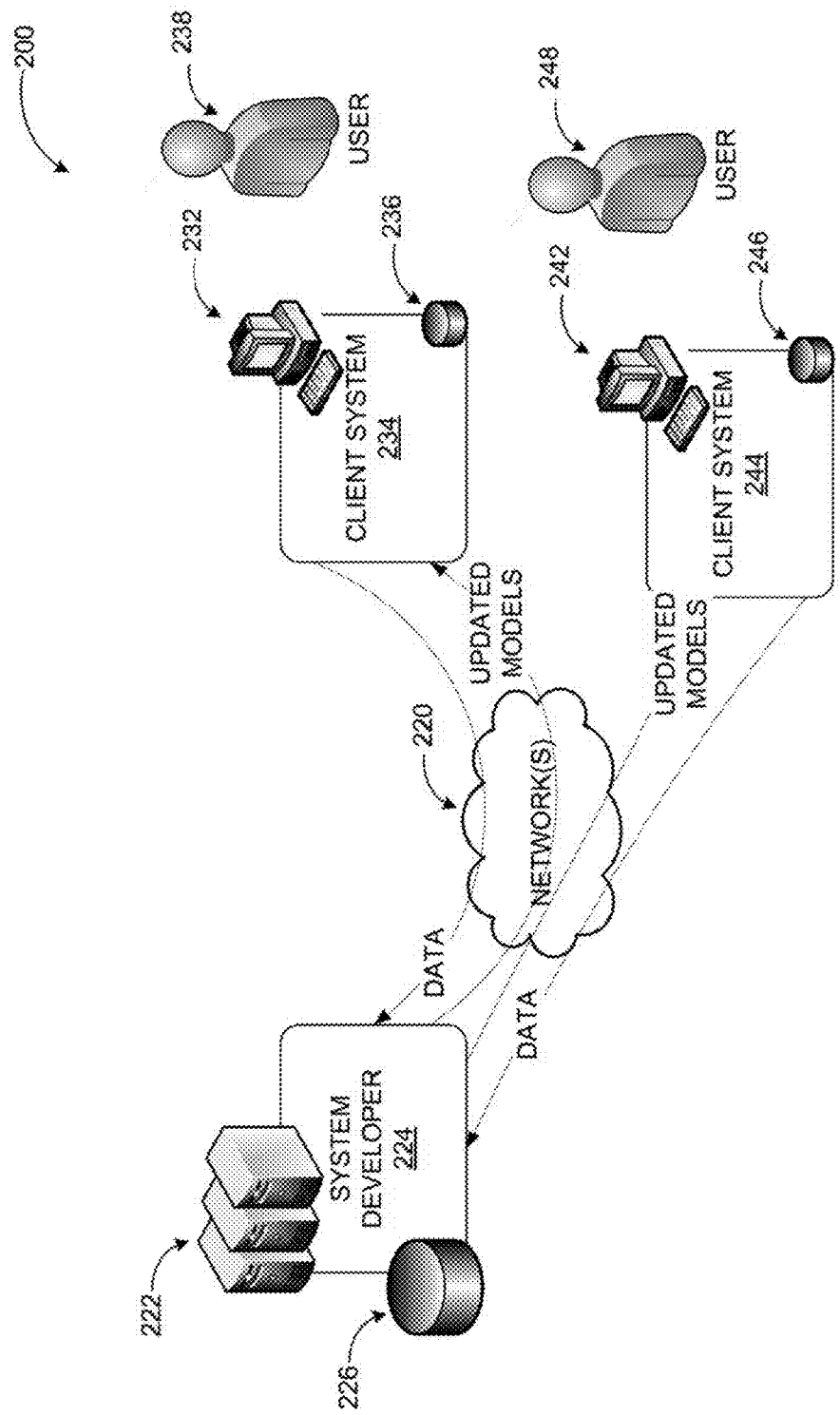
FIG. 2 is a diagram illustrating remote feedback loop mechanisms in an example speech recognition system.

FIG. 2 is a diagram illustrating remote feedback loop mechanisms in an example speech recognition system. By providing a process for both local adaptation and remote feedback within a single framework, a system according to embodiments incentivizes users to provide valuable training data to system developers. By taking data from particular steps from the local adaptation process, privacy concerns on the data sent back to the developer can be reduced.

In a local feedback loop (also called 'adaptation'), data from the user is collected to make the speech recognition models match the user better. In a remote feedback loop, data from many users is collected to make the speech recognition models better in general, or better match the scenario. Two main models used in speech recognition are typically modified through this process: acoustic models, which model what phonemes sound like, and language models, which model how words fit together to make sentences.

As shown in diagram 200, system developer 224 may include application(s) executed on one or more servers 222 that are arranged to receive feedback from a plurality of users (238, 248, etc.), perform statistical analysis on the received feedback, and update existing acoustic and language models based on the analysis results. For example, words not included in original models, but popularized since then (e.g. Zune®) may be determined from frequent use by many users and be added to the models. Updated models and other data may be stored in system developer's data stores 226.

Users 238, 248 may utilize speech recognition applications executed on computers 232, 242 of client systems 234, 244. Local data such as locally customized models may be stored in the client systems' data stores 236, 246. Client systems 234, 244 may communicate with system developer 224 over one or more networks 220, and provide feedback data as discussed above. Client systems 234, 244 may also receive updated generic models from system developer 224 over networks 220.

The feedback data and the updated models may be exchanged through various methods including, but not limited to, email, file transfer, access through a hosted service, and comparable ones.

Figure 3:
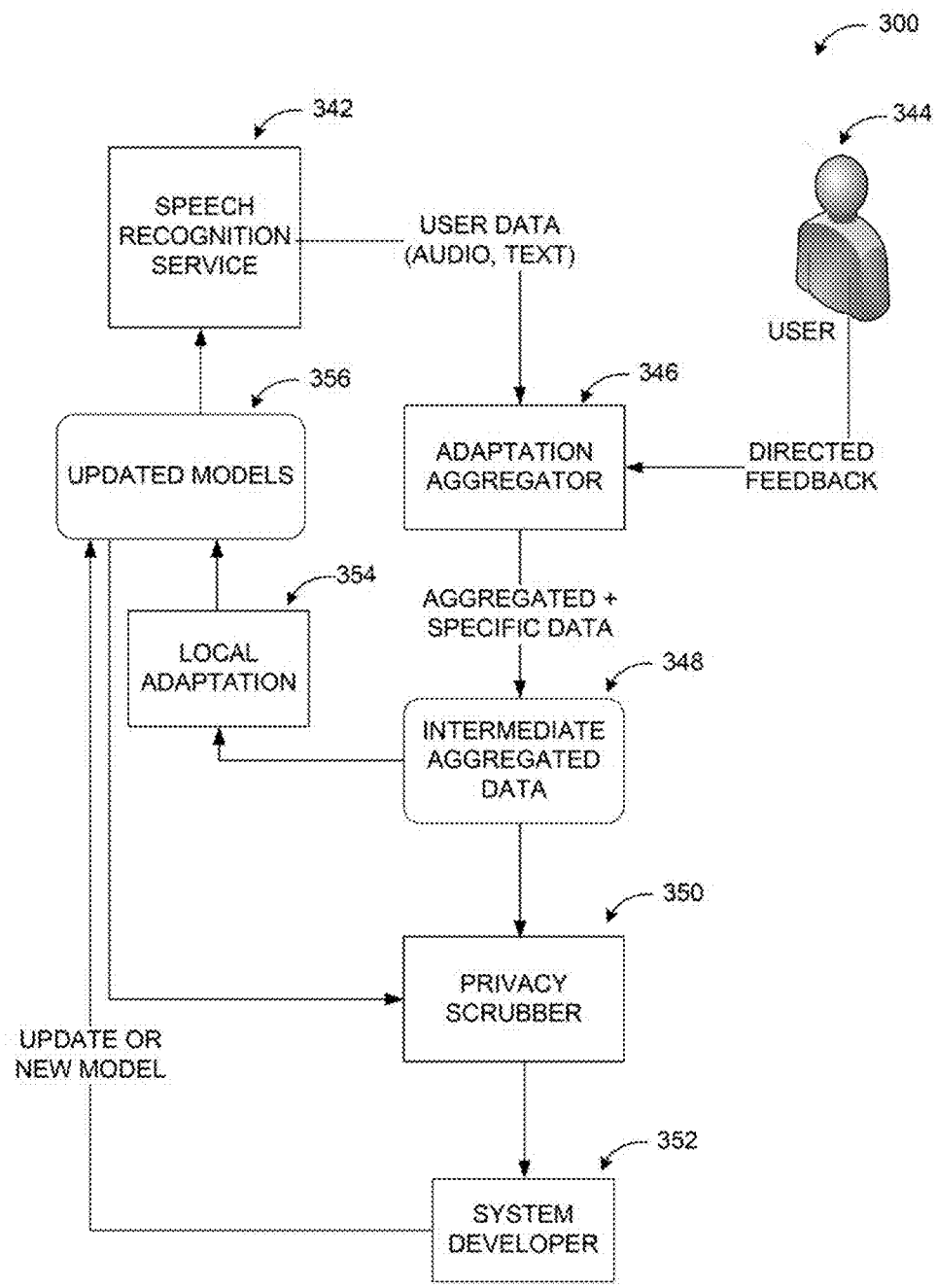
FIG. 3 is a block diagram illustrating major components of a speech recognition system employing local and remote feedback loops according to embodiments.

FIG. 3 is a block diagram illustrating major components of a speech recognition system employing local and remote feedback loops according to embodiments. Generally, in creating an updated model for local adaptation, there is a local aggregation step, because the models do not contain specific examples, but instead contain statistics about what is likely. According to one embodiment, the local adaptation framework is leveraged for the remote feedback loop. Rather than sending the raw data back for the remote feedback loop, the local adaptation framework is used to generate an intermediate file, which is forwarded to the system developer. This way, privacy concerns are reduced.

According to another embodiment, directed user feedback is integrated into the feedback loop framework. Directed user feedback is the process where the speech recognition system learns from correction of an utterance by the user such as a response to a yes/no question. This is above and beyond generally learning what the user sounds like. By integrating local and remote feedback loops, the directed user feedback mechanism may be added to the remote feedback loop as well. Without the local feedback loop, a user typically does not have incentive to provide this data.

Moreover, having a closed loop enables the system to collect data, the privacy status of which may be uncertain at the beginning. The feedback loop may clarify the uncertainty and classify the collected data as not private. In which case, the data may be forwarded to the system developer.

Speech recognition service 342 of diagram 300 may collect user data (in audio and text format) from a variety of sources. For example, documents, emails, and the like, in the user's computer may be harvested to determine frequently used words or word sequences by the user. For dictation systems, the standard language modeling technology is generally called "n-grams". If n is 3, then they are called "trigrams". A trigram is the probability of a particular three word sequence occurring. In the local feedback loop, data from the contents of emails and word processing documents, spreadsheets, and the like are collected by the adaptation aggregator 346. For every detected trigram (or other sequence), a number of times the trigram is used is determined. This is an intermediate form.

In a system according to embodiments, directed feedback by user 344 may also be provided to adaptation aggregator 346 and added to the collected data resulting in intermediate aggregated data 348. Intermediate aggregated data 348 is not as verbose as the original text, and has therefore significantly less privacy concerns than the original text. It is also aggregated over some body of content. The privacy concerns may be further reduced by removing specific contents from the intermediate data 348 at privacy scrubber 350. For example, any trigrams containing digits may be removed, since many sources of privacy concerns include digits (phone numbers, social security numbers, credit card numbers, and similar ones).

According to one embodiment, the intermediate aggregated data 348 is provided to local adaptation module 354, which generates updated models 356 for immediate use by the speech recognition service 342. According to another embodiment, the intermediate aggregated data 348 is also provided to system developer 352 after the filtering by privacy scrubber 350. System developer 352 provide updated or new model to speech recognition service 342 further enhancing a quality of the recognition process.

Speech recognition systems are provided with particular vocabulary. This is typically generic vocabulary that is expected to broadly cover the English (or other) language. It may not contain most proper names, or project names. These can either be directly added by the user, or the system may automatically learn them through the document harvesting feature. For sending data back to system developer, trigrams may be submitted that contain words shipped with the system, and the list of added words (without context). Any trigrams containing words added on the user's machine may be assumed to have some element of privacy concern, and thus removed in the process of preparing to send data back to the system developer.

The new words are sent to the system developer without context. For example, uncommon last names may be sent back as a new word. This is not concerning from a privacy point of view, because such last names may be transmitted for anyone communicating with the user, and would not identify a particular user. Once these are aggregated, the system developer may identify words that should be added to updated models and release them to all interested users enhancing the generic models in the base vocabulary. By having a layered approach to privacy, a conservative approach may be taken and initially some non-private information removed. This removed data may be identified later through another part of the feedback loop and the process automatically updated to begin collecting this now positively identified as non-private. As an added measure, the user may also be provided with the option of giving permission before any data is sent to the system developer.

For acoustic models, a conventional remote feedback mechanism is to save the audio, and use that to train a new model. Much like with language models, the intermediate aggregated data 348 is provided to the system developer for acoustic models as well in a speech recognition system according to embodiments, but with different details. Additionally, conventional speech recognition systems do not take advantage of directed user feedback for remote feedback loop. By providing direct feedback, this learning mechanism is faster and more efficient than other mechanisms for the system. System developers can benefit from this direct method by receiving the intermediate and aggregated data, which contains directed user feedback as well.

The speech recognition systems, components, configurations, and feedback mechanisms illustrated above are for example purposes and do not constitute a limitation on embodiments. A speech recognition system with local and remote feedback loops may be implemented with other components and configurations using the principles described herein.

Figure 4:
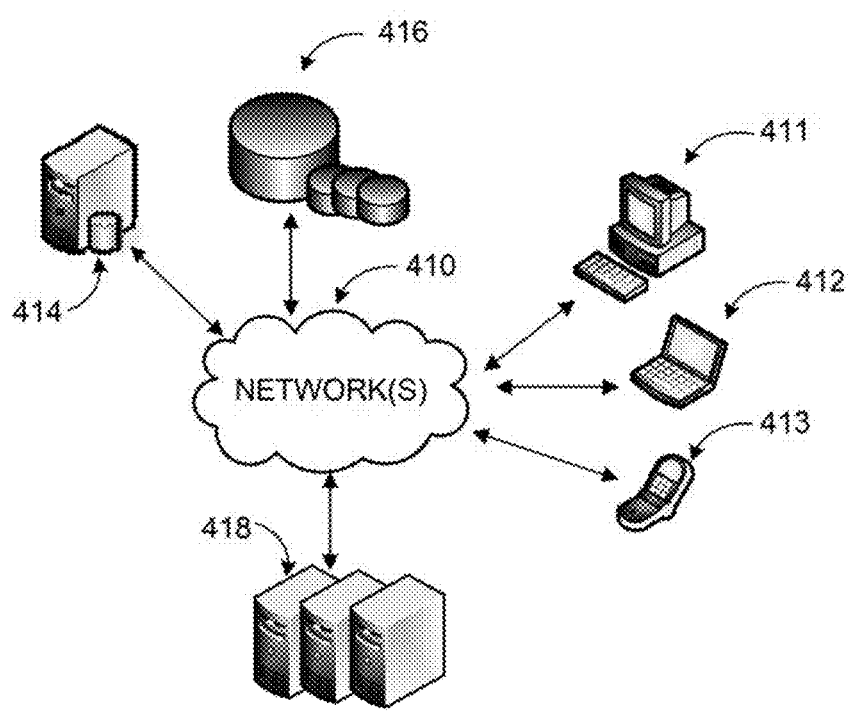
FIG. 4 is a networked environment, where a system according to embodiments may be implemented.

FIG. 4 is an example environment, where embodiments may be implemented. A local and remote feedback looped speech recognition system may be implemented via software executed over one or more servers 418 such as a hosted service. The platform may communicate with client applications on individual computing devices such as a cellular phone 413, a laptop computer 412, and desktop computer 411 ('client devices') through network(s) 410.

As discussed previously, client devices 411-413 are used to facilitate communications employing a variety of modes between users of the speech recognition system. Locally or in a distributed manner executed speech recognition applications may generate local training data based on collected user data and or directed user feedback. The locally collected data may be filtered at different levels for local storage and for submittal to a system developer (e.g. servers 418) through a remote feedback loop. Such data, as well as training models, and other speech recognition related data may be stored in one or more data stores (e.g. data store 416), which may be managed by any one of the servers 418 or by database server 414.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a local and remote feedback looped speech recognition system. Furthermore, the networked environments discussed in FIG. 4 are for illustration purposes only. Embodiments are not limited to the example applications, modules, or processes.

Figure 5:
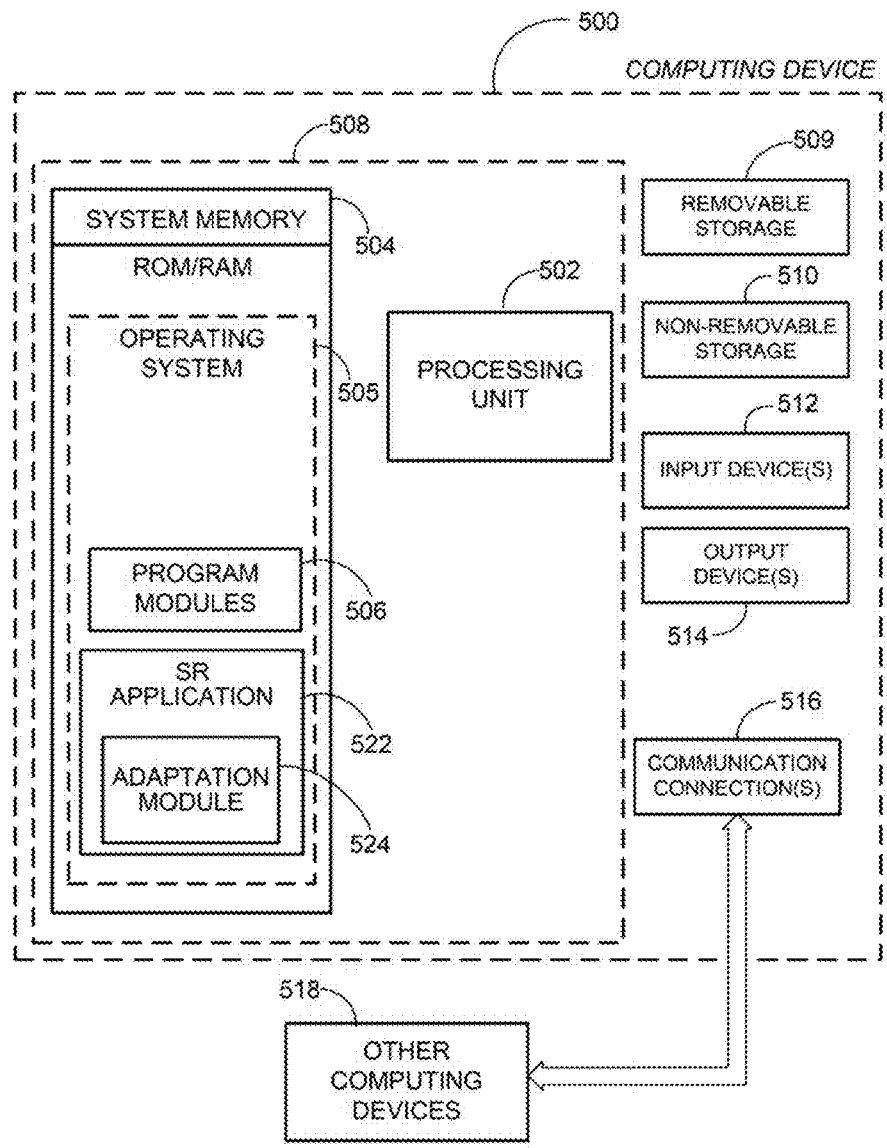
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a client device executing a speech recognition application and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS ® operating systems from MICROSOFT CORPORATION of Redmond, Wash. The system memory 504 may also include one or more software applications such as program modules 506, speech recognition application 522, and adaptation module 524.

Speech recognition application 522 may be any application that performs speech recognition as part of a service as discussed previously. Adaptation module 524 may be an integral part of speech recognition application 522 or a separate application. Adaptation module 524 may collect user data and/or directed user feedback associated with recognized speech, and provide feedback to a speech recognition engine for customization of acoustic and language training models. Adaptation module 524 may further provide locally collected data, after filtering to address privacy concerns, to a system developer for enhancement of generic training models. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 505, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, other directory or presence servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media, The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
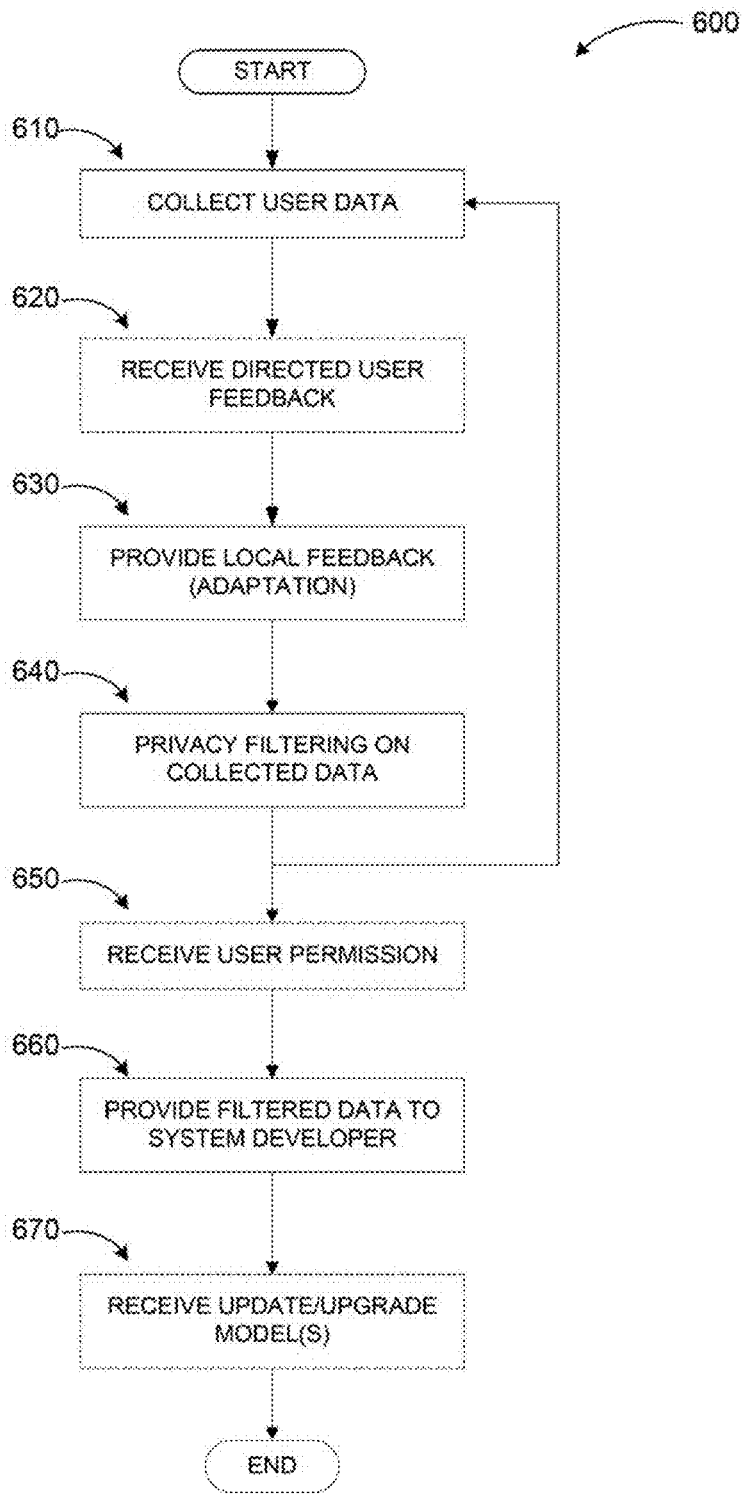
FIG. 6 illustrates a logic flow diagram of implementing a local and remote feedback looped speech recognition system.

FIG. 6 illustrates a logic flow diagram for process 600 of implementing a local and remote feedback looped speech recognition system according to embodiments. Process 600 may be implemented in any speech recognition application.

Process 600 begins with operation 610, where user data associated with speech recognition is collected. Collection of user data may include harvesting of data front user documents, email, and the like through methods like n-gram modeling. Other methods may include user provided samples (read passages, etc.). At optional operation 620, a directed feedback may be received from the user. Directed feedback includes user responses to system generated prompts such as yes/no answers that gauge accuracy of recognized utterances (e.g., "Did you say you want Technical Assistance?").

At operation 630, the collected data and optionally the directed user feedback are provided as local feedback (adaptation) to the speech recognition engine for customization and enhancement of local training models. As discussed above, the locally-collected data or even directed user feedback may include private information At operation 640, the data is filtered to address privacy concerns such as removing numbers, and other personal information. Some of the filtering may be performed on locally stored data such that the user is protected from having their private data exposed through their local machine. This is illustrated in process 600 by the loop from operation 640 to operation 610.

Some of the locally collected data may be subjected to a different level of filtering in order to ensure protection of the user's privacy prior to submittal of the data to a system developer. At optional operation 650, another layer of privacy protection may be performed by explicitly requesting user permission for submitting the data to the system developer.

At operation 660, the filtered data is provided to the system developer for enhancement and update of generic training models as discussed previously. This may be followed by optional operation 670, where updates to the training models or upgrade replacements of the same are received from the system developer.

The operations included in process 600 are for illustration purposes. Improving speech recognition systems with local and remote feedback loops may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing speech recognition with local and remote feedback loops, the computing device composing:
   a communications device configured to communicate with a remote system developer over a communications network;
   one or more processors; and
   a memory storing instructions that when executed by the one or more processors, cause the computing device to perform a method comprising:
      collecting user data associated with a user, wherein the user data includes audio by the user and textual data from user generated documents;
      filtering the collected data at distinct levels for local and generic models to protect private data;
      updating one or more local models with the user data filtered at the local model level, each local model comprising at least one of a local acoustic model that models how phonemes sound or a local language model that models how words fit together to form sentences;
      providing, over the communications network, user data filtered at the generic model level to the remote system developer to enable the remote system developer to update one or more generic models comprising at least one of a remote acoustic model that models how phonemes sound or a remote language model that models how words fit together to form sentences;
      receiving speech inputs; and
      recognizing, by a speech recognition system, the speech inputs based at least in part on the updated one or more local models and the updated one or more generic models.

2. The computing device of claim 1, wherein the method further comprises:
   receiving, over the communications network, one or more updated generic models from the system developer; and
   updating the one or more local models with the received one or more updated generic models.

3. The computing device of claim 1, wherein the method further comprises:
   receiving directed user feedback to recognized speech, the user feedback comprising at least one of textual data or audio; and
   aggregating the directed user feedback with the collected user data.

4. The computing device of claim 1, wherein the method further comprises:
   processing the collected user data to detect trigrams, wherein filtering the collected data comprises removing the trigrams that include digits to address privacy concerns associated with the digits, wherein the digits describe one or more of: phone numbers, social security numbers, or credit card numbers.

5. The computing device of claim 1, wherein collecting the user data comprises harvesting textual data from one or more documents in the computing device employing an n-gram method.

6. The computing device of claim 5, wherein collecting the user data comprises harvesting textual data from one or more of: emails, word processing documents, or spreadsheets that employ trigrams.

7. The computing device of claim 1, wherein the method further comprises statistically analyzing the collected user data to determine updates to the one or more local models.

8. The computing device of claim 7, wherein the statistical analysis includes determination of words popularized since a release of the one or more local models.

9. A method for providing speech recognition with local and remote feedback loops, the method comprising:
   collecting user data including audio and textual data from one or more computing devices associated with a user, wherein the textual data is collected from user generated documents;
   receiving directed feedback from the user in response to recognized speech, the feedback comprising at least one of textual data or audio;
   aggregating the collected user data and the directed feedback;
   filtering the aggregated data at a first level to protect private data;
   storing the aggregated data filtered at the first level in one or more local models for customizing current language and acoustic models;
   filtering the aggregated data at a second level for one or more generic language and acoustic models to remove private data;
   providing the aggregated data filtered at the second level to a system developer to enable the system developer to update the generic language and acoustic models;
   receiving a speech input; and
   recognizing, by a speech recognition system, the speech input based at least in part on the updated one or more local models or the updated one or more generic language and acoustic models.

10. The method of claim 9, further comprising:
    prior to providing the aggregated data filtered at the second level to the system developer, enabling the user to provide permission for forwarding of the aggregated data filtered at the second level to the system developer; and
    in response to receiving permission, providing the aggregated data filtered at the second level to the system developer.

11. The method of claim 10, wherein removing the private data from the aggregated data includes:
    temporarily removing all private data; and
    upon determining that a subset of the private data is non-private data, adding the non-private data to the filtered data prior to providing to the system developer.

12. The method of claim 10, wherein removing the private data from the aggregated data includes removing numbers from the aggregated data.

13. The method of claim 9, wherein the one or more computing devices execute a distributed speech recognition application that capture the user data in a distributed manner.

14. A computer-readable storage device with instructions stored thereon that when executed by one or more processing units, cause the one or more processing units to perform a method for speech recognition with local and remote feedback loops, the method comprising:
    collecting user data including audio and textual data, wherein the textual data is from user generated documents;
    receiving directed feedback from the user in response to recognized speech, the feedback comprising at least one of audio or textual data;
    aggregating the collected user data and the directed feedback;

filtering the aggregated data at different levels for the local and the remote feedback loops to protect private data;

storing the data filtered at the local feedback level to customize current language and acoustic models;

providing the data filtered at the remote feedback level to a system developer to enable the system developer to update speech recognition generic language and acoustic models;

receiving speech inputs; and recognizing, by a speech recognition system, the speech inputs based at least in part on the customized current language and acoustic models and the updated generic language and acoustic models.

15. The computer-readable storage device of claim 14, wherein the user data is collected through at least one of:
harvesting the textual data from at least one of: emails, word processing documents, or spreadsheets associated with the user employing trigrams; or
receiving a user spoken text passage.

16. The computer-readable storage device of claim 15, wherein the filtered data provided to the system developer includes trigrams containing words from original language models and a list of added words.

17. The computer-readable storage device of claim 14, wherein the filtered data is provided to the system developer through one of: an email exchange, a file transfer, or an access through a hosted service.

* * * * *